United States Patent [19]

Groenendyke, deceased et al.

[11] 4,210,869
[45] Jul. 1, 1980

[54] ROTATING TELLURIC FIELD MEASUREMENTS

[75] Inventors: Goethe M. Groenendyke, deceased, late of Dallas, Tex., by Betty Groenendyke, sole heir; Gustave L. Hoehn, Jr., Dallas, Tex.

[73] Assignee: Mobil Oil Corporation, New York, N.Y.

[21] Appl. No.: 26,144

[22] Filed: Apr. 2, 1979

Related U.S. Application Data

[63] Continuation-in-part of Ser. No. 875,264, Feb. 6, 1978, abandoned.

[51] Int. Cl.² ............................................. G01V 3/00
[52] U.S. Cl. .................................. 324/349; 324/350
[58] Field of Search .................................. 324/1, 8, 9

[56] References Cited

U.S. PATENT DOCUMENTS

| | | | |
|---|---|---|---|
| 2,034,447 | 3/1936 | Schlumberger | 324/1 |
| 2,240,520 | 5/1941 | Schlumberger | 324/1 |
| 2,284,990 | 6/1942 | Schlumberger | 324/1 |
| 2,531,088 | 11/1950 | Thompson | 324/1 |
| 2,586,667 | 2/1952 | Kunetz | 324/1 |
| 2,623,097 | 12/1952 | Kunetz | 324/1 |
| 2,677,801 | 5/1954 | Cagniard | 324/1 |
| 3,052,836 | 9/1962 | Postma | 324/1 |
| 3,188,559 | 6/1965 | Yungul | 324/1 |
| 3,422,345 | 1/1969 | Muse | 324/8 |
| 3,514,693 | 5/1970 | Cagniard | 324/1 |

*Primary Examiner*—Gerard R. Strecker
*Attorney, Agent, or Firm*—C. A. Huggett; William J. Scherback

[57] ABSTRACT

In magneto-telluric geophysical exploration, the earth's electric telluric field in two orthogonal directions is determined. Electrodes are positioned on the earth's surface so that measured potentials between adjacent electrodes measures the earth's telluric field in known directions. These measurements are converted to signals representing the earth's telluric field in two specified orthogonal directions. The measurements are made between electrodes spaced along a cable which is laid on the ocean floor.

8 Claims, 5 Drawing Figures

ROTATING TELLURIC FIELD MEASUREMENTS

CROSS REFERENCE TO RELATED APPLICATIONS

This application is a continuation-in-part of application Ser. No. 875,264, filed Feb. 6, 1978, now abandoned.

BACKGROUND OF THE INVENTION

This invention relates to geophysical exploration and more particularly to marine magneto-telluric geophysical exploration.

It has long been known that telluric currents circulate beneath the surface of the earth. The prior art suggests that the measurement of these naturally occurring currents will indicate the resistivity of the earth and hence the geophysical characteristics of the subsurface. However, these telluric currents are subject to variations caused by external influences, such as sunspot activity. Because these variations are unpredictable, measurement of telluric currents was little used as a geophysical exploration tool until Louis Cagniard devised a technique which accounted for these variations. His work is represented, for example, in U.S. Pat. No. 2,677,801, wherein he proposes measuring not only the telluric currents but also the magnetic field at a measurement station on the earth's surface. Cagniard teaches the relationship between the measured orthogonal components of the earth's magnetic field and the measured orthogonal components of the earth's telluric electric field.

The teachings of Cagniard have been successfully implemented in magneto-telluric geophysical exploration on land. In magneto-telluric exploration on land, the magnetic field sensors and the telluric current electrodes are precisely laid out with surveying instruments. In this manner, the measured orthogonal components of the magnetic and telluric electric fields are precisely known with respect to specified orthogonal geographic directions, which are usually north-south and east-west.

Cagniard also suggests, in FIGS. 5 and 6 of his U.S. Pat. No. 2,677,801 that marine magneto-telluric exploration can be carried out. Attempts to carry out marine magneto-telluric exploration have not been completely successful. It has not been possible to precisely align the underwater sensors with respect to the specified orthogonal directions. It is virtually impossible for a diver to use surveying instruments under water in order to align the sensors in the same way that alignment is carried out in making magneto-telluric measurements on the surface of the earth.

In accordance with the present invention, the requirements for precisely aligning magneto-telluric sensors with respect to specified geographical directions is obviated.

SUMMARY OF THE INVENTION

In accordance with the present invention, magneto-telluric measurements are made in two directions which are known but which are not necessarily specified orthogonal directions. Measurements are translated or rotated into values representing the measurements in the specified orthogonal directions.

In carrying out the invention, the earth's electric telluric field is measured with electrodes including a common electrode and two adjacent electrodes. The geographical locations of these electrodes are known and hence the directions of the straight lines connecting the electrodes are known. However, these directions need not be specified and need not even be orthogonal directions. From the known directions, the measurements are rotated into electric signals representing the earth's electric telluric field in the specified orthogonal directions.

The invention is particularly applicable to marine magneto-telluric exploration wherein a cable having electrodes spaced along its length is laid on the ocean bottom. It is not necessary to lay the cable in a specified pattern. Acoustic transponders locate each of the electrodes. From the location of each electrode, measurements of the electric field between two adjacent electrodes are translated into signals representing the electric field in specified orthogonal directions. These signals can be related to the magnetic field measurements.

The foregoing and other objects, features and advantages of the invention will be better understood from the following more detailed description and appended claims.

DESCRIPTION OF A PARTICULAR EMBODIMENT

Figure 1:
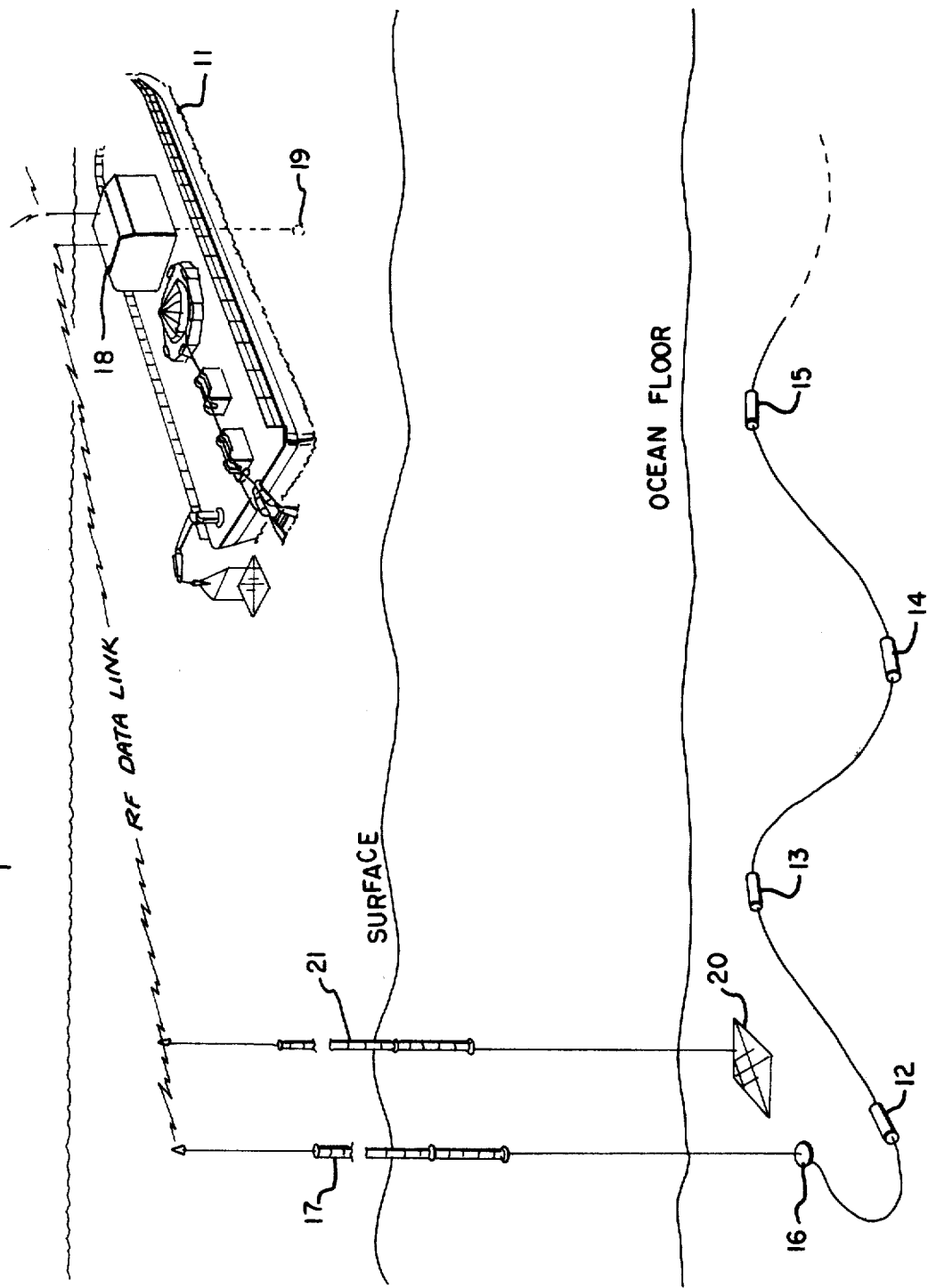
FIG. 1 shows a marine magneto-telluric exploration technique to which the present invention is applicable.

Referring to FIG. 1, marine magneto-telluric exploration is carried out by an exploration vessel 11 which lays magneto-telluric sensors on the ocean bottom. These sensors include electrodes included in modules 12–15 which are connected by a cable. Electrodes measure the telluric potential at the spaced locations of the modules. These telluric measurements are transmitted through the cable which is anchored at 16. A telemeter buoy 17 transmits the telluric potential measurements to the shipboard data acquisition system 18.

Each of the modules 12–15 includes an acoustic transponder which transmits acoustic pulses to the acoustic location antenna 19 on the exploration vessel. A typical acoustic transponder and location system which is suitable for use is the ATNAV II system from AMF Inc.

Two magnetic field sensors are included on a frame 20 which is laid on the ocean bottom. Frame 20 also includes a flux gate magnetic compass which generates signals identifying the directions of the magnetic field measurements. Magnetic field measurements and directions are transmitted to the exploration vessel by the telemeter buoy 21. It has been found that the magnetic field does not vary greatly over the area which is covered by the cable with the electric field electrodes. Therefore, a simple measurement of the magnetic field in two orthogonal directions may be used in conjunction with all of the telluric electric field measurements in the cable.

Figure 2:
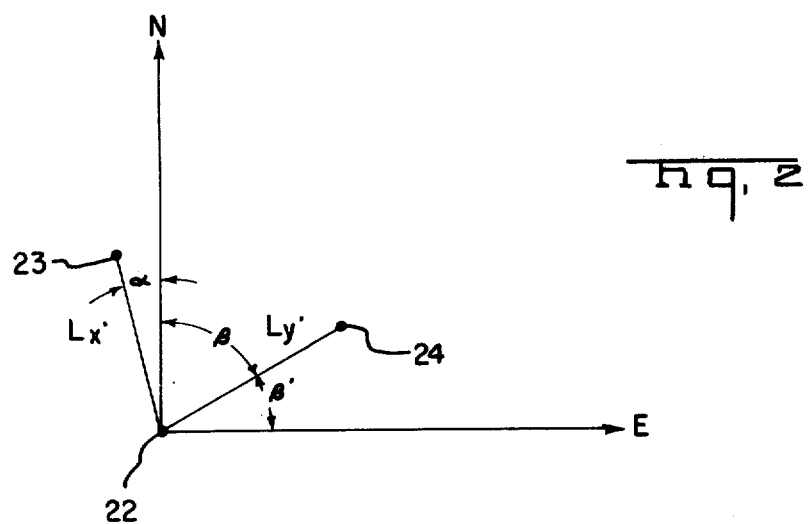
FIG. 2 depicts three adjacent electrodes and their relationship to specified orthogonal directions.

FIG. 2 depicts the position of common electrode 22 (for example, module 13 of FIG. 1) and adjacent electrodes 23 and 24 (for example, modules 12 and 14 of FIG. 1) on the ocean bottom. These electrodes are used to measure the earth's telluric field in a first direction which extends between common electrode 22 and electrode 23. Similarly, the earth's telluric field in a second direction, which extends between common electrode 22 and electrode 24, is measured. These directions are known from the acoustic transponder/acoustic location system. From this system, the angles $\alpha$ and $\beta'$ between these directions and the two specified orthogonal directions can be determined. As shown in FIG. 2, the two specified orthogonal directions are north-south and east-west. From this system, spacings between electrodes can also be determined. In this example, the spacing between the electrode 22 and electrode 23 will be denoted $L_x$, and spacing between electrodes 22 and 24 will be denoted $L_y$.

In accordance with the present invention, the measured electric fields are translated into signals representing the telluric field in two specified orthogonal directions and with an idealized electrode spacing L.

The measured telluric potentials are denoted $V_{x'}$ and $V_{y'}$ where $V_{x'}$ is the potential between electrodes 22 and 23 and $V_{y'}$ is the potential between electrodes 22 and 24. These measured potentials are translated into electric signals representing the potentials $V_x$ and $V_y$ in the two specified orthogonal directions over some idealized electrode spacing L in accordance with $$V_x = AV_{x'} + BV_{y'}$$

$$V_y = CV_{x'} + DV_{y'}$$

Where A, B, C and D are parameters related to $\alpha$, B, L, $L_{x'}$, and $L_{y'}$ by $$A = \left[ \frac{\cos \beta'}{\cos \alpha \cos \beta' + \sin \alpha \sin \beta'} \left( \frac{L}{L_{x'}} \right) \right] \quad (1)$$

$$B = \left[ \frac{\sin \alpha}{\cos \alpha \cos \beta' + \sin \alpha \sin \beta'} \left( \frac{L}{L_{y'}} \right) \right] \quad (2)$$

$$C = \left[ \frac{-\sin \beta'}{\cos \alpha \cos \beta' + \sin \alpha \sin \beta'} \left( \frac{L}{L_{x'}} \right) \right] \quad (3)$$

$$D = \left[ \frac{\cos \alpha}{\cos \alpha \cos \beta' + \sin \alpha \sin \beta'} \left( \frac{L}{L_{y'}} \right) \right] \quad (4)$$

As an example, consider the case where $L_{x'} = 600$ feet, $L_{y'} = 700$ feet, $\alpha = 15°$ and $\alpha' = 30°$, with $L = 600$ feet. Then the parameters are given by:

$$\cos \alpha \cos \beta' + \sin \alpha \sin \beta' = \cos(\alpha - \beta') = \cos(-15°) = 0.96593$$

$$A = \frac{\cos 30°}{.96593} \left( \frac{600}{600} \right) = .89658$$

$$B = \frac{\sin 15°}{.96593} \left( \frac{600}{700} \right) = .22967$$

$$C = \frac{-\sin 30°}{.96593} \left( \frac{600}{600} \right) = -.51764$$

$$D = \frac{\cos 15°}{.96593} \left( \frac{600}{700} \right) = .85714$$

Figure 3:
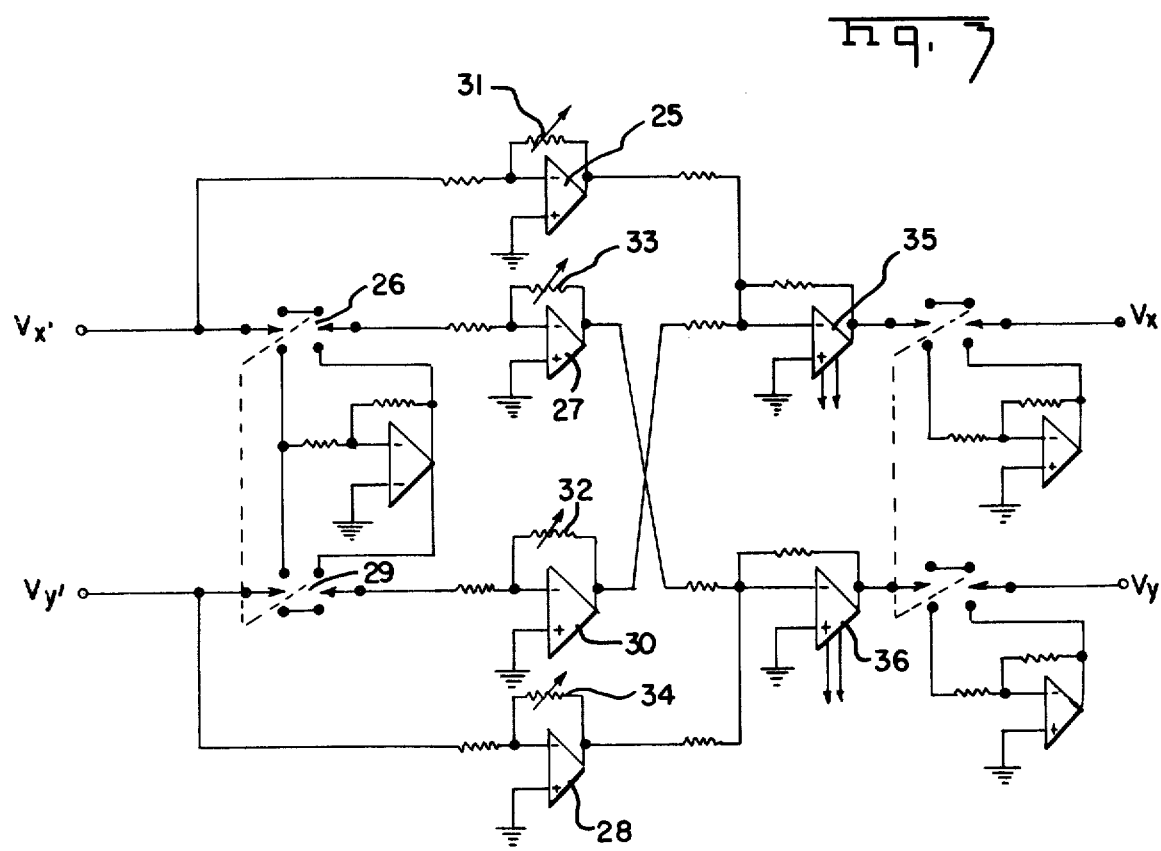
FIG. 3 shows a circuit for rotating the measured telluric potentials into specified orthogonal directions.

An example of a circuit for generating electric signals representing the telluric field and/or potential in two specified orthogonal directions is shown in FIG. 3. The measured voltage $V_{x'}$ is applied to the operational amplifier 25 and it is applied through the polarity reversing switch 26 to the operational amplifier 27. The measured voltage $V_{y'}$ is applied to the operational amplifier 28 and it is applied through the polarity reversing switch 29 to the operational amplifier 30. Potentiometers 31–34 are set to the values of A, C, B, and D, respectively. The operational amplifier 35 forms the sum $AV_{x'} + BV_{y'}$. The operational amplifier 36 forms the sum $CV_{x'} + DV_{y'}$.

The three remaining operational amplifiers are used as unity-gain inverting amplifiers. They permit the algebraic sign of any particular constants A, B, C, or D to be reversed.

Figure 4:
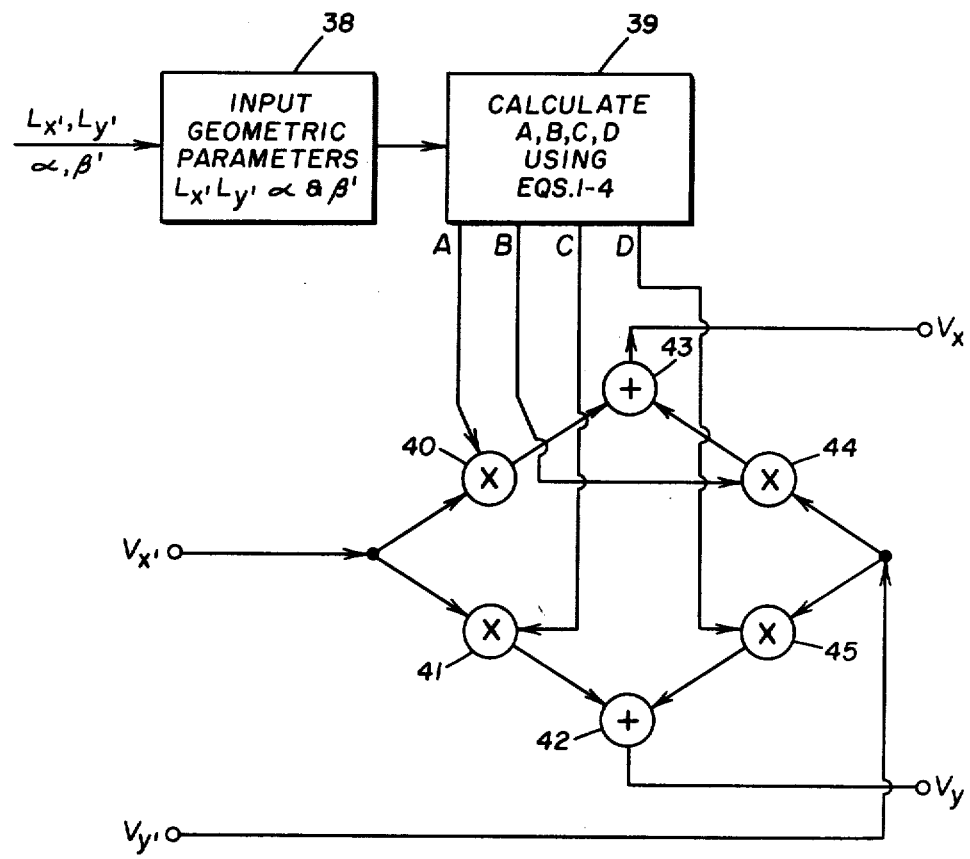
FIG. 4 repesents a hardwired digital system equivalent to the circuit of FIG. 3.

FIG. 4 represents an equivalent hardwired digital system to provide two orthogonal components for the E field in a magneto-telluric system. The four constants, A, B, C, and D, are determined in unit 39 in a manner previously described utilizing Equations 1 through 4 following measurement of the orientation of electrodes and determination of parameters $L_{x'}$, $L_{y'}$, $\alpha$ and $\beta'$. Unit 38 represents an input device to calculator unit 39. The calculation unit 39 may be comprised of special purpose chips such as calculator chips of the regular hand calculator variety. The digital values of constants A, B, C, and D are applied, respectively, to individual inputs of multipliers 40, 44, 41, and 45. Digital values of the measured voltage $V_x$, obtained from a conventional A-D converter (not shown) are applied to another input of multiplier 40 and to another input of multiplier 41. At the same time, digital values of voltage $V_y$ are applied to inputs of multipliers 44 and 45. The result is the appearance at the output of multiplier 40 of the function $AV_{x'}$ and at the output of multiplier 44 of the function $BV_{y'}$. These two functions are applied to adder 43 whose output is the desired digital value of the orthogonal voltage $V_x$. Similarly, there appears at the output of multiplier 41 the function $CV_{x'}$ and at the output of multiplier 45 the function $DV_{y'}$. These latter two functions are combined in adder 42 to produce the desired digital value of the orthogonal voltage $V_y$. In practice, devices are often combined as multiplying adders and have special applications in dedicated digital hardwire. For example, a large-scale integrated circuit of the TDC-1010J type can accomplish all of the multiplying and summing of FIG. 4 at a significant saving in wiring cost. The alternate procedure to accomplish this same task digitally would be in the microprogramming of special purpose microprocessors, such as the very standard 8- and 16-bit variety of microprocessors. The Z80 or the LSI-11 microprocessors are typical.

Figure 5:
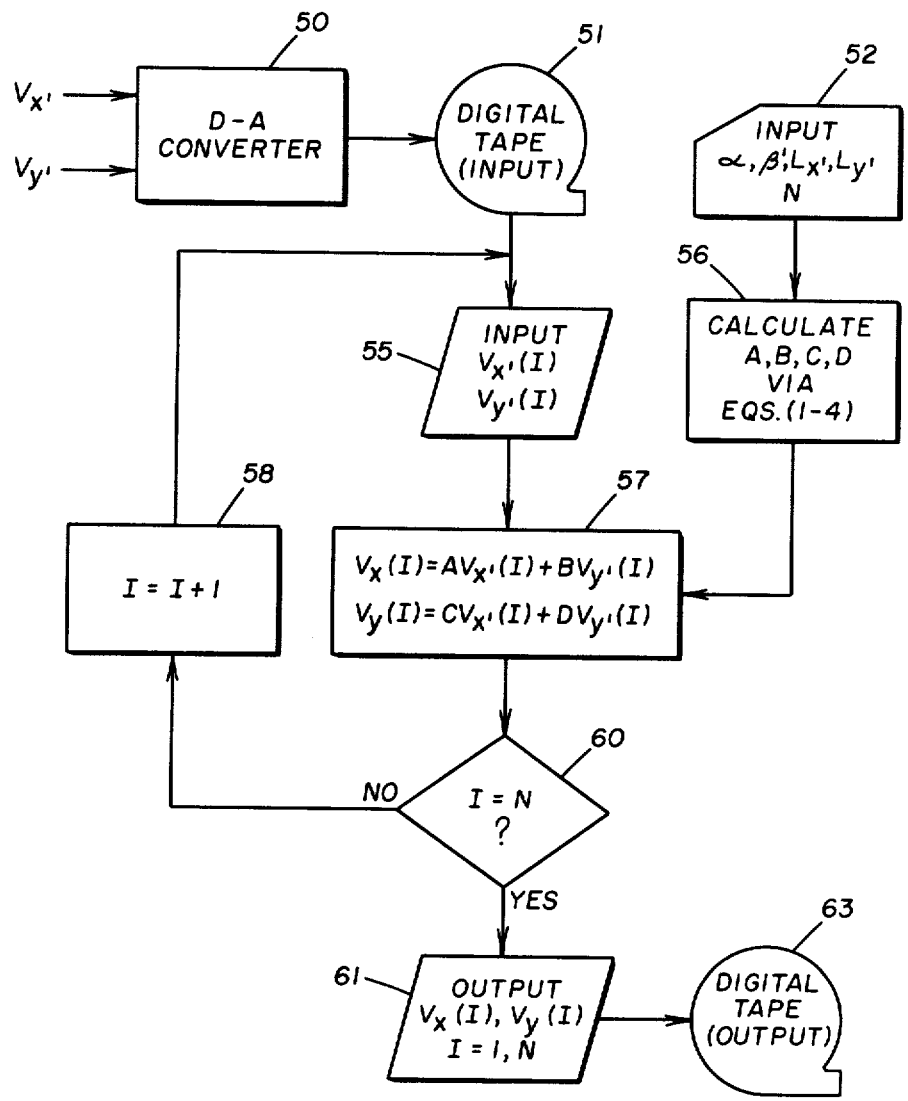
FIG. 5 illustrates a flow diagram representing the practice of the invention with a general purpose digital computer.

FIG. 5 is a flow diagram representing the practice of the invention utilizing a general purpose digital computer. A-D converter 50 generates digital quantities repesentative of the measured values $E_{x'}$ and $E_{y'}$ which are stored on magnetic tape in unit 51. The parameters $\alpha$, $\beta'$, $L_{x'}$ and $L_{y'}$ are determined in manner previously described and are input, for example, by way of a punched card or cards 52 to that function of the computer represented by block 56. Parameters or constants A, B, C and D are generated in accordance with the relationship represented by Equations 1 through 4. The output of the subroutine flows to the next logic operation represented by block 57.

The output of tape unit representing the digital values of measured voltages $E_{x'}$ and $E_{y'}$ is applied via input unit 55 to the logic operation of block 57 where the orthogonal values $E_x$ and $E_y$ are produced. These are indexed upon an integer parameter I which can range from initial value of 1 to a final value of n, depending upon the quantity of data that has been acquired and the length of time over which this quantity data is acquired. The test in block 60 is merely a logic test to determine if all data has been processed. When the indexing parameter I has reached the final value of the acquired data, n, the resultant values of $E_x$ and $E_y$ in block 57 are output by way of block 61 into some data storage media such as digital tape 63 or onto graphic recorders or in the form of numeric printouts.

The logic function of block 57 provides the means for producing a pair of signals $AV_{x'}$ and $BV_{y'}$ and for combining them to provide the signal value of $E_x$. It also provides the means for producing a pair of signals $CV_{x'}$ and $DV_{y'}$ and for combining them to provide the signal value of $E_y$.

Large arrays of the digital values of $E_x$ and $E_y$ may be stored at high speed into the machine since the generation of values by way of the logic represented by block 56 would proceed at many times perhaps the real time acquisition rate of the original data and, depending upon the size of the computer, one could store large quantities of data. The values of $E_x$ and $E_y$ are stored in successive memory locations in buffer storage until the indexing parameter has reached the value n and then the buffer is dumped onto tape 63 by way of output 61.

While various embodiments of the invention have been shown and described, additional modifications are within the true spirit and scope of the invention. The appended claims are intended to cover all such modifications.

What is claimed is:

1. In magneto-telluric geophysical exploration, the system for determining the earth's electric telluric field in two orthogonal directions comprising:
    (a) means for measuring the earth's telluric field along a first horizontal line in a first known direction and for producing a first telluric signal representative thereof,
    (b) means for measuring the earth's telluric field along a second horizontal line in a second known direction and producing a second telluric signal representative thereof,
    (c) means for producing a pair of signals representative of the values of said first and second telluric signals along a third predetermined horizontal line and for combining said pair of signals to provide a signal representative of the earth's electric telluric field along said third horizontal line, and
    (d) means for producing a pair of signals representative of the values of said first and second telluric signals along a fourth horizontal line orthogonal to said third horizontal line and for combining said pair of signals to provide a signal representative of the earth's electric telluric field along said fourth horizontal line.

2. The system recited in claim 1 wherein the means for measuring the earth's telluric field along said first and second horizontal lines comprises at least three electrodes positioned on the earth's surface with at least one electrode being displaced from a straight line.

3. The system recited in claim 2 wherein one of said electrodes is common to both said first and second horizontal lines.

4. The system recited in claim 3 for use in marine geophysical exploration and which further comprises:
    a cable for lying on the ocean bottom with said electrodes being spaced along said cable.

5. The system recited in claim 4 further comprising:
    means for transmitting from each electrode a signal establishing the location of that electrode so that the directions of said horizontal lines can be established.

6. The system of claim 1 wherein said means for producing pairs of signals representative of the telluric signals along said third and fourth horizontal lines are variable gain amplifiers.

7. The system of claim 6 wherein said variable gain amplifiers are operational amplifiers.

8. The system of claim 6 wherein said means for combining said pairs of signals representative of the earth's telluric field along said third and fourth horizontal lines are summing amplifiers.

* * * * *